United States Patent [19]

Madden et al.

[11] Patent Number: 5,061,001
[45] Date of Patent: Oct. 29, 1991

[54] EXPANDABLE MODULAR SYSTEM

[75] Inventors: Michael D. Madden; James S. Maginnis, Jr., both of Louisville, Ky.

[73] Assignee: Mobile Systems Research Manufacturing, Inc., Louisville, Ky.

[21] Appl. No.: 199,272

[22] Filed: May 26, 1988

[51] Int. Cl.[5] .............................................. B62D 33/08
[52] U.S. Cl. ........................................ 296/26; 296/27; 296/171; 52/67
[58] Field of Search .................. 296/26, 27, 171, 175; 52/67, 68

[56] References Cited

U.S. PATENT DOCUMENTS 2,898,144  8/1959  Ferrera ................................ 296/171
2,901,282  8/1959  Meaker ................................ 296/171
2,965,412  12/1960 Henderson .......................... 296/171
3,107,116  10/1963 Meaker ................................ 296/171

Primary Examiner—Robert R. Song
Attorney, Agent, or Firm—Edward M. Steutermann

[57] ABSTRACT

An expandable modular enclosure which allows substantial increase in the available interior size. An expanding floor section is provided within the enclosure assembly and extensible retractable modules are provided to extend laterally outwardly from the enclosure and supported in the extended mode by cantilever support arrangements which are movable on bearing assemblies to allow the extension and retraction of the modular segments.

3 Claims, 2 Drawing Sheets

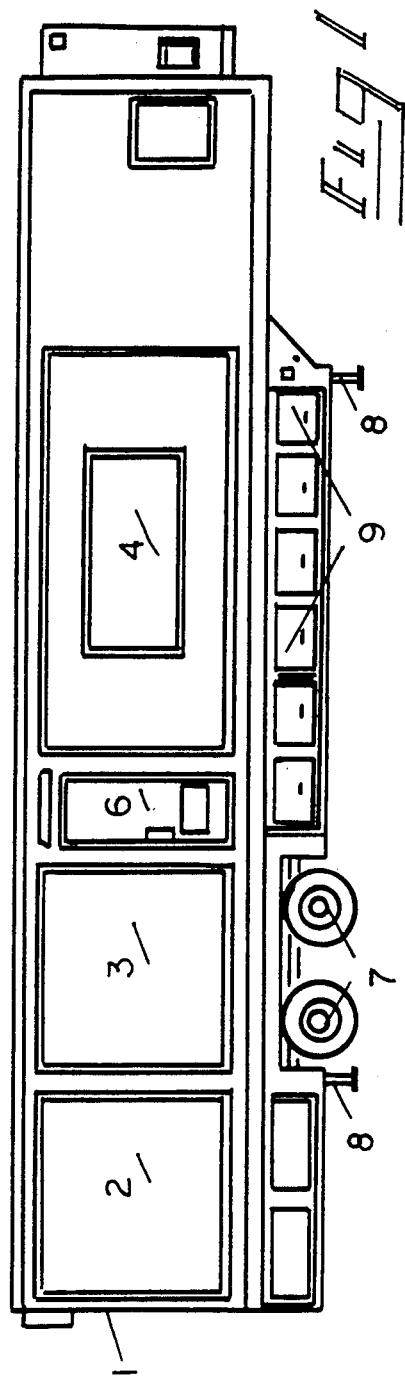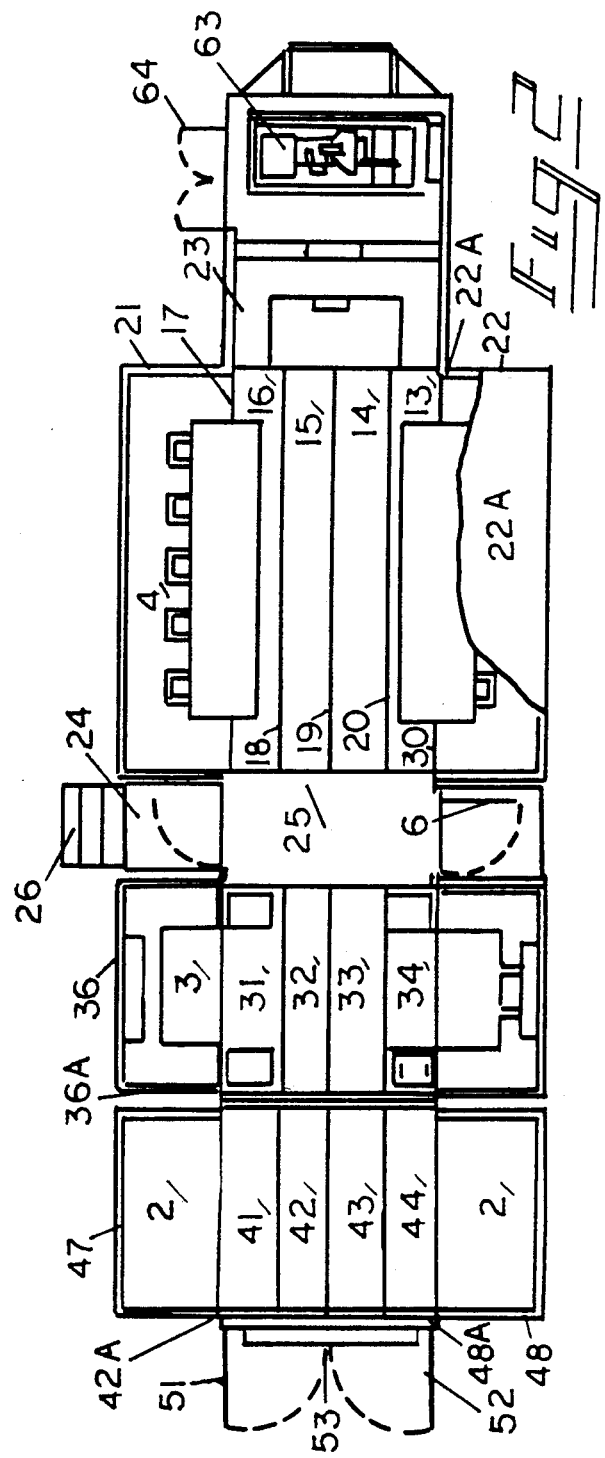

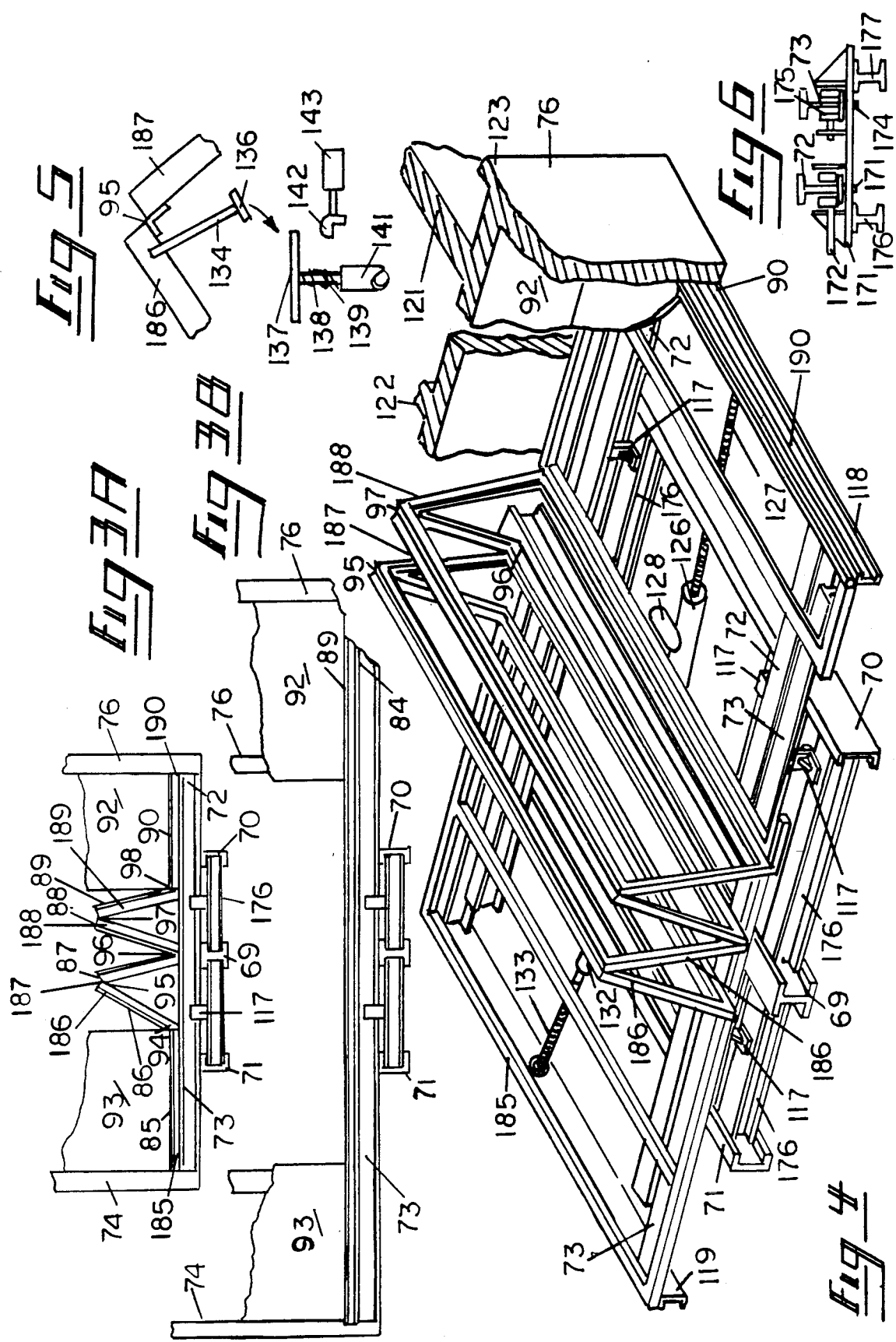

EXPANDABLE MODULAR SYSTEM

BACKGROUND OF THE INVENTION

The present invention relates, in general, to enclosures including mobile vehicles. While the present invention is related to expansible enclosures generally it will be described with reference to mobile trailer type vehicles which are pulled by a tractor. However, it will be understood that the concepts and devices within the scope of the present invention can be used equally well with other types of vehicles other than trailers such as semi portable shelters maritime vehicles or other enclosures.

Trailers, similar mobile vehicles and semi permanent but moveable shelters have been utilized for many years. In more recent times mobile vehicles have come to be used for other purposes such as conducting training sessions, product display and even mobile laboratories and construction facility management.

In general, trailers, and other mobile vehicles are limited in available size both by constraints imposed by governmental agencies, as well as physical constraints imposed by highway size.

Over the years, the use of trailers and mobile type vehicles as movable locations for the above enumerated purposes has grown and such vehicles have been found quite satisfactory for these purposes.

Until the present invention no prior art arrangement was known to satisfactorily allow the expansion of a mobile vehicle by use of modular assembly capable of heavy load bearing capacity; after it has been located on site, to permit expanded work area or meeting rooms or for other purposes.

The prior art does, however, include some reference to expandable devices, principally for camping purposes, and includes U.S. Pat. No. 4,463,982 which relates to a retractable extension for a recreational vehicle and U.S. Pat. No. 3,583,755 which also relates to a recreational type vehicle. In both cases the prior art references relate to camping trailers and even if they did relate to devices for purposes similar to the intent of the present invention the arrangements would not anticipate the present invention because of the difference in structural facilities. Expandable modular enclosures are also provided by Calumet Coach Co., of Calumet City Ill., Monex Corp. of Albany, Oreg. and Ellis and Watts of Cincinnati, Ohio.

However, no prior art arrangement is known which teaches or even remotely suggests arrangments within the scope of the present invention.

SUMMARY OF THE INVENTION

The present invention, as stated hereinbefore, relates in general to expandable contractable vehicle facilities useful for purposes such as meetings, displays, on site analysis, construction or administration for mobile application such as trailers, boats, portable equipment such as shelters, boats, or refrigerated cargo or stationary enclosures.

Devices within the scope of the present invention can be constructed to allow, almost, a doubling of the available space in the vehicle after it is located on site. Further, the arrangement provided by the present invention allows equipment, furniture, and other devices to be stored in the mobile while it is being moved and the furniture can be arranged as desired once the vehicle has been setup. Alternatively, heavy equipment can be permanently fixed in the expandable modules and because of the load bearing capabilities of the modules the modules can then be moved automatically. Devices within the scope of the present invention are distinguishable by the means by which the expansion is accomplished.

Briefly, the device has a multi-element center floor portion which allows two or more sections of floor to be folded into the center of the vehicle where extensible-retractable modules are located on either sides of the floor sections and are easily withdrawn into the mobile vehicle body. The floor can be stored in an "A" or "I" configuration and is connected to support members, for example, steel "I" beams which are moved outwardly beneath the expandable modules to allow cantilevered support of the modules and at the same to allow the floor to expand. The "I" beams are supported by bearing members carried on the frame of the mobile vehicle chassis so that the modules extend laterally outward from the chassis. The side panels of the module slide directly into the main frame and seals can be provided between the mobile vehicle body and the openings where the members silde outwardly.

Briefly, the present invention provides an expandable enclosure which allows substantial increase in the available interior size and load bearing capability when the vehicle is parked where a multi-section floor section is provided within the trailer assembly and the extensible retractable sections are provided to extend laterally outwardly and the extensible retractable sections are supported by cantilever support arrangements which are movable on bearing assemblies to allow the extension and withdrawal of the expandable segments of the modular unit.

It will be understood that various other arrangements within the scope of the present invention will occur to those skilled in the art upon reading the disclosure set forth hereinafter but, the examples within the scope of the present invention are presented herein and described hereinafter but are not intended to be by way of limitation but are for purposes of illustration only.

BRIEF DESCRIPTION OF THE DRAWINGS

In the examples in accordance with the present invention described hereinafter and illustrated in the accompanied Figures:

FIG. 1, is an elevational view of one example of a trailer assembly within the scope of the present invention;

FIG. 2, is a plan view of the trailer of FIG. 1 shown with side modules extended;

FIG. 3A and 3B illustrate the extension and withdrawal of examples of modules in generally cross section view;

FIG. 4 is a detailed perspective view of the framework utilized in devices within the scope of the present invention;

FIG. 5 is a detailed view of a locking arrangement within the scope of the present invention; and FIG. 6 is a free body illustration of a cantilever support module useful in the present invention.

DETAILED DESCRIPTION OF THE DRAWINGS

Referring now to FIG. 1, a elevational view of trailer is shown which utilizes an arrangement within the scope of the present invention.

In FIG. 1, the trailer 1 rides on wheels 7 as is known in the art. Jacks 8 are provided to level and stabilize the vehicle when it is on site. It will be understood that, while not shown, means can be provided to connect the trailer 1 shown in FIG. 1 to an appropriate tractor for movement over the road and to a location at which point the device is to be "setup".

In general, the arrangement shown in FIG. 1 includes extensible modules 2, 3, and 4 described hereinafter with reference to FIG. 2, 3, and 4 where the modules can be moved generally outwardly from the trailer body 1.

A door 6 is provided to provide access to the trailer, both when the modules are withdrawn and when they are extended.

Referring now to FIG. 2 which is a plan view of a trailer of the type shown in FIG. 1 with the modules extended, modules 2, 3, and 4 are shown in the extended position. Wall members 47, 48 of the section 2, (it will be understood that the sections can be extended outwardly from both sides, and withdrawn into the center of the trailer) are provided and extend through apertures 47A and 48A provided in the trailer. Likewise the walls 36, and 39 of the module 3 extend through openings 36A and 39A of the trailer wall. Similarly, the walls 21 and 22 of the 4 are extended through openings 21A and 22A as shown.

As also shown, each of the modules is fully structually complete and stable and, as shown with reference to module 4, each can include a roof, for example roof 22R shown in partial section.

The door 6 is shown and as shown also, stairs 26 can be provided to be located to provide access to the trailer. Additionally, a platform 24 can be provided to extend outwardly from the trailer by means of appropriate mountings located beneath the trailer body 1 and the chassis 61.

As also shown, the useful space available can be nearly doubled by extension of the modules 2, 3, and 4. In accordance with one feature of the present invention heavy equipment can be located in the modules so it is not necessary to move the equipment after the vehicle is set up. In the arrangements shown two tables have been setup in one section, laboratory facilities can be provided in extension sections 3 and work areas can be provided in module 2.

In the arrangement shown each section includes double "A" frame type floor arrangement. For example in module 4 floor sections 13, 14, 15, and 16 are provided and shown in the "down" position and the hinges 17, 18, 19, 20, and 30 are shown where the floor pivots as the modules 21, and 22 are drawn into the trailer body 1 as described hereinafter.

It will be understood that other collapsible extensible floor arrangements can also be used within the scope of the present invention.

As also shown an opening 53 can be provided in the rear of the trailer and doors 51 and 52 can be provided to close the opening prior to movement of the trailer.

Also, as shown floor sections 31-34 are provided in connection with the extension and withdrawal of the walls 36 and 39. The floors operate about the hinges. Similarly, with respect to the extension provided for module 2 the floor section 41-44 are provided to fold to the double "A" configuration. In each case it will be noted that the floor in the modules remain intact to allow storage of equipment.

A utilities cabinet 63 can be provided with access doors 64 to, for example, house a generator or other arrangements to provide power for operation of the device and the equipment located within the device.

All of the flooring sections shown in FIG. 2 are similar and FIG. 3A, 3B, and 4 illustrate the assembly and operation of the flooring sections in all of the modules. However, it will be understood that other extensible/retractable flooring arrangements also within the scope of the present invention will occur to those skilled in the art upon reading the disclosure set forth hereinafter.

Referring now to FIGS. 3A and 3B which illustrate sequential operation of an example of a device within the scope of the present invention, and referring to specifically to FIG. 3A, an arrangement is shown with the modules in retracted position where the entire assembly is supported on, in this case from the chassis channels 70 and 71 which are part of the chassis of the vehicle connecting members 176, which can be "I" beams provided and optionally connected to a central support 69, which can also be an "I" beam. The modules 92 and 93 ride on floor supports 72 and 73 which are supported on bearing assemblies 117 as shown in more detail in FIG. 6. In FIG. 6 it can be seen that the supports 72 and 73 ride on roller bearings 171, 174 and have roller bearings 172 and 175 engaging the inner surfaces of the flanges of the supports by using a spaced pair of the assemblies 117 as shown in FIG. 3A, 3B and 4 and the supports 72, 73 can be cantilever supported to allow extension of the associated modules outwardly from the position shown in FIG. 3A to the position shown in FIG. 3B. In the arrangement shown a double "A" floor is provided with frame members 186-189 as described hereinafter where the various frame members can be interconnected and connected to floor frames 185 and 190 by means of continuous hinges 94-98 or other means. It will be understood that the floor frame are located within the modules 92 and 93 and move with the modules as shown in FIG. 3B while the floor sections 186-189 are unfolded.

Flooring sections 86, 87, 88, and 89 are located, respectivelly, in frames 186-189. Outer wall sections 74 and 76 are connected to the structual assembly as shown as are side walls of the modules 92, and 93. As previously stated the arrangements shown in FIGS. 3A is illustrated with the extension modules located within the trailer body.

FIG. 3B is an illustration of the arrangement as it would appear with the modules in the extended position. In FIG. 3B all the elements enumerated and described with reference to FIG. 3A are the same except that the support member 72 has been extended to the right on bearing assemblies 117 and the frame member 73 has been moved to the left to open the device outwardly. In the outward position the walls 76 and 139 of the vehicle are exposed, and as can be shown, sealing means described hereinafter can be provided to provide a seal between the side walls of the modules 92 and 93 in the extended position and between the walls 74 and 76 when the device is the retracted position.

Turning now to FIG. 4 which is a perspective view of an assembly in partially extended position, frames 186-189 which correspond to the frame members 186-189 of FIG. 3A and 3B are shown. Also shown are the floor support members 72, 73 at both sides of the floor section.

An example of an outer wall 76 and the innerwall of the module 92 are also shown. Also shown is a wall 121 of the trailer where a seal 123 is shown carried to extend outwardly from the wall 76. Additionally, a sealing edge 122 can be provided at the outer side of the wall of module 92 to engage the inner surface of wall 121 to provided sealing at this location also when the module is extended.

Floor section 90 is shown located over the frame 190 as shown in FIG. 3B. It will be understood that the flooring is located within all of the frames 185-190 as shown in FIG. 3A and 3B.

As also shown bearings assemblies 117 can be provided on supports 176, 177, as shown in FIG. 6. Channel members 118 119 can be connected to frames 185, 190 respectively for connection of wall members and the other structural framing of the the module extension assembly. As previously discussed bearing members 117 allow movement of the frame members 72, 73 and cantilever and support the module in the retracted and extended position. However, it will be understood that other bearing means can be used to provide the actual surface for engagement with the structual members.

Extension and retraction of the modules can be accomplished by various means out in the arrangement shown jack screws 126 and 132 are provided where jack screw 126 is driven by motor 128 (the motive means for screw 132 is not shown) to extend and withdraw the jack end channels 118 and 119 to move the frame members 72 and 73 inwardly and outwardly as desired. The channels 118 and 119 are adapted to receive the ends of the jack screws.

FIG. 5 is an illustration of another feature within the scope of the present invention which facilitates extension and withdrawal of the module sections. In the arrangement shown, the frame members 186 and 187 are shown along with a continuous hinge 95 which would typically be provided therebetween. A rod 134 ,is connected, for example, to the frame 186 so that the rod 134 moves as the "A" frame portion 186 is withdrawn and extended. The rod carries a striker plate 136. A cam 137 is provided with a rod 139 located in a tubular guide 141 and rod 134 is provided with a spring 138 to bias cam 137 outwardly from guide 141.

A normally extended solenoid 143 carries a follower 142 where the solenoid is located as striker 136 engages cam 137 it pushes the rod down to compress spring 138 in normal operation when as the frame 186 is extended. When frame 186 is in the fully extended position a slight downward force moves the frame sections 186 and 187 fully horizontal postion so the cam 137 is engaged by the follower 142 which retracts then extends to hold cam 137 and striker 136 down where both are caught in the notch 144 of follower 142. When it is desired to retract the module, solenoid 143 is actuated so that the follower 142 is drawn toward the solenoid body and the cam 137 and striker 136 are allowed to move upwardly under the force of the spring 138. This allows upward movement of the frames 186 and 187 to provide the angle necessary to facilitate withdrawal of the modules by, in this case, the jack screws 132 and 126.

It will be understood that the foregoing is but one example of an arrangement within the scope of the present invention and that various other arrangements also within the scope of the present invention will occur to those skilled in the art upon reading the disclosure set forth hereinbefore.

The invention claimed is:

1. An expandable enclosure including chassis means having a longitudinal axis, first and second extensible-retractable floor support means adapted to be extended laterally from opposite sides of said chassis to a first position and retracted to second position with said floor support means located inwardly from said first position; cantilever support means to secure said first and second floor support means to said chassis means to allow the extension and withdrawal of said first and second floor support means; frame assembly including first and second fixed frame means secured to said first and second floor support means respectively where the length of each of said first and second frame means in a distance transverse to said longitudinal axis is less than the distance from the center of said chassis to the outer edge of said respective first or second floor support means where said first and second frame means are connected at their respective inner edges to first, second, third, and fourth articulated frame means, whereby said first, second, third and fourth articulated frame means are disposed in "AA" configuration when said frame members are in said second position and move to co-planar relation with said first and second frame means in said first position; and motive means to move said first and second frame means between said first and second positions.

2. The invention of claim 1 wherein extensible retractable floor sections are retained on said first and second frame means.

3. The invention of claim 1 including a central enclosure located over said chassis with at least one module carried by at least one of said first and second frame means and located within said central enclosure when said first and second frame means are in the second position and located outwardly from said central module when said first and second frame means are in said first position.

* * * * *